United States Patent
Li et al.

(10) Patent No.: US 11,018,503 B2
(45) Date of Patent: May 25, 2021

(54) OVERVOLTAGE PROTECTION CIRCUIT AND ELECTRICAL DEVICE INCLUDING SUCH A PROTECTION CIRCUIT

(71) Applicant: Schneider Electric Industries SAS, Rueil-Malmaison (FR)

(72) Inventors: Bo Li, Shanghai (CN); Miao-Xin Wang, Montbonnot St Martin (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 189 days.

(21) Appl. No.: 16/275,370

(22) Filed: Feb. 14, 2019

(65) Prior Publication Data
US 2019/0273378 A1    Sep. 5, 2019

(30) Foreign Application Priority Data
Mar. 5, 2018  (FR) ...................................... 18 51874

(51) Int. Cl.
*H02H 9/04*  (2006.01)
*H02H 1/00*  (2006.01)
*H02H 9/02*  (2006.01)

(52) U.S. Cl.
CPC ............ *H02H 9/04* (2013.01); *H02H 1/0007* (2013.01); *H02H 9/025* (2013.01)

(58) Field of Classification Search
CPC ........ H02H 9/04; H02H 9/025; H02H 1/0007; H02H 9/02
USPC .......................................................... 361/86
See application file for complete search history.

(56) References Cited

U.S. PATENT DOCUMENTS

| | | | |
|---|---|---|---|
| 3,760,228 A | 9/1973 | Uchida | |
| 5,208,494 A | 5/1993 | Ikonen et al. | |
| 5,793,589 A * | 8/1998 | Friedl | H02H 3/445 |
| | | | 361/58 |
| 2011/0149444 A1 | 6/2011 | Koolen et al. | |
| 2013/0258721 A1 | 10/2013 | Boulharts et al. | |

FOREIGN PATENT DOCUMENTS

| | | |
|---|---|---|
| EP | 2 645 569 A1 | 10/2013 |
| WO | WO 93/07666 A1 | 4/1993 |
| WO | WO 2010/020898 A1 | 2/2010 |

OTHER PUBLICATIONS

French Preliminary Search Report dated Nov. 21, 2018 in French Application 18 51874, filed on Mar. 5, 2018 ( with English translation of categories of Cited Documents and written opinion).

* cited by examiner

*Primary Examiner* — Dharti H Patel
(74) *Attorney, Agent, or Firm* — Oblon, McClelland, Maier & Neustadt, L.L.P.

(57) ABSTRACT

A protection circuit intended to be connected between an electrical energy source and an overvoltage-sensitive device. A current limiting circuit and a current monitoring circuit are connected in series, a reference voltage generator circuit delivering a reference voltage, and a balancing circuit is intended to control the current monitoring circuit so that the voltage at a point of connection between the current limiting circuit and the current monitoring circuit is substantially equal to the reference voltage. An electrical measurement or power supply device including at least one such overvoltage protection circuit.

20 Claims, 6 Drawing Sheets

OVERVOLTAGE PROTECTION CIRCUIT AND ELECTRICAL DEVICE INCLUDING SUCH A PROTECTION CIRCUIT

TECHNICAL FIELD

The present invention relates to an overvoltage protection circuit comprising an input intended to be connected to an electrical energy source and an output intended to be connected to a device to be protected against overvoltages. The invention relates also to an electrical measurement or power supply device comprising at least one such overvoltage protection circuit.

STATE OF THE ART

Many electrical devices are connected to the electrical network for their energy supply. Such devices are then subject to disturbances, transmitted by the electrical network. Among the disturbances, there are the overvoltages that can be of natural origin, such as a lightning strike, or generated by the operation of an electrical device such as the control of an inductive load, for example a motor. The overvoltages transmitted over the electrical network can be of very high energy, so the electrical devices must be protected to avoid the degradation thereof. This protection relates primarily to a resistance to the amplitude of the overvoltage and to the dissipation of the energy contained in said overvoltage. Components of varistor type are often used to dissipate the energy of the overvoltages with the drawback of a limited lifespan, all the shorter when the number and the energy of the disturbances is high. Active components, such as transistors, are also used. Currently, the transistors have a voltage withstand strength lower than 2 kV which is inadequate for withstanding overvoltages of an amplitude lying between 6 and 8 kV, conventionally measured in the event of lightning strikes. An association of several transistors and varistors is therefore necessary with constraints on the response time of the assembly, all the active components having to react simultaneously, particularly on steep voltage edges, and constraints on the necessary dissipation of the energy contained in the overvoltage.

The document EP 0 497 478 A2 is known which relates to a protection circuit intended to protect against overvoltages of the inputs of a measurement device. Such a device implements MOSFET transistors that can be associated in series in order to achieve a voltage withstand strength greater than the voltage withstand strength of a single MOSFET. However, the protection circuit requires fast bipolar transistors to discharge the stray capacitances between gate and source of the MOSFET transistors and allow a very rapid blocking of the transistors in the event of an overvoltage spike. Also, the series connection of several stages to increase the voltage withstand strength increases the series resistance of the circuit. This is not a drawback for a measurement input but such a circuit cannot be used as protection for the power supply of a circuit, the energy dissipated in the series resistors being potentially excessive.

The document WO 2006/129 005 A1 is known which relates to a protection device comprising an association of current limiting means placed in series between the electrical network and the electrical circuit to be protected and limiting means placed in parallel to divert a disturbance current out of the circuit to be protected. Several stages are needed to clip the overvoltages without dissipating too much energy, each stage having different voltage withstand strength characteristics.

Also known are the documents EP 2 124 310 A1 and EP 2 124 326 A1, intended to protect a power supply of capacitive type against overvoltages. The documents describe the association of two normally closed field-effect transistors, mounted in series and operating in current limiting mode. A two-way transil diode is mounted in parallel to divert a part of the disturbance current out of the circuit to be protected. The use of a disturbance current limiting means, placed in series, makes it possible to limit the energy dissipated in the limiting means placed in parallel. In this way, the lifespan of the transil diode is increased.

The devices known from the prior art do not describe a circuit benefitting simultaneously from a resistance to overvoltages of amplitude greater than several times the voltage withstand strength of a single transistor, from a limiting of the current circulating in the device while guaranteeing a low series resistance in normal operation and from an extremely fast response time.

SUMMARY OF THE INVENTION

The aim of the invention is a protection circuit avoiding the drawbacks of the devices of the state of the art, of a design that is simple and easy to adapt to the expected overvoltage level.

For that, the invention describes a protection circuit for an electrical load intended to be connected in series between an electrical energy source and the electrical load to be protected, the electrical energy source supplying an electrical current to the electrical load, said protection circuit comprising:
  an input for connecting the protection circuit to the electrical energy source,
  an output for connecting to the electrical load,
  a reference voltage generator circuit arranged to supply at least one first reference voltage,
  a current limiting circuit, connected to the output, said limiting circuit being arranged to limit the electrical current passing through it,
  a first current monitoring module connected in series on one side with the limiting circuit at a first point of connection and on the other side connected to the input, said first current monitoring module comprising:
    a first current monitoring circuit for monitoring the amplitude of the electrical current passing through it, and
    a first balancing circuit connected to the voltage generator to receive the first reference voltage and connected to the first point of connection to receive a first voltage, the first balancing circuit being arranged to control the first current monitoring circuit so that the first voltage is substantially equal to the first reference voltage.

Preferentially, the current limiting circuit comprises, at least, a first field-effect transistor of normally closed type and a first series resistor connected between the gate and the source of the first field-effect transistor, the drain being connected to the first point of connection, the gate being connected to the connection output of the protection circuit.

Preferentially, the first current monitoring module comprises, at least:
  a second field-effect transistor of normally closed type and a second series resistor connected between the gate and the source of the second field-effect transistor, the drain being connected to the connection input of the protection circuit, and a first bipolar transistor of NPN type connected in such a way that:
  the collector of the first bipolar transistor is connected to the source of the second field-effect transistor,
  the emitter of the first bipolar transistor is connected to the gate of the second field-effect transistor and to the first point of connection, and that
  the base of the first bipolar transistor is connected to the reference voltage generator to receive the first reference voltage.

Preferably, the first and the second field-effect transistors are fabricated in silicon carbide or in gallium nitride.

Advantageously, the reference voltage generator circuit is linked on one side to the input for connecting the protection circuit to the electrical energy source and on the other side to the output for connecting the protection circuit to the electrical load.

Preferentially, the reference voltage generator circuit comprises a first and a second resistors, connected in series, of substantially equal value, and the first reference voltage is supplied at a second point of connection between the first and the second resistors.

Preferably, the current limiting circuit limits the current to an amplitude lying between 50 and 500 mA.

Advantageously, the overvoltage protection circuit is such that:
  the reference voltage generator generates a second reference voltage, of amplitude greater than the first reference voltage, and such that:
  a second current monitoring module is connected in series on one side with the first current monitoring module at a third point of connection, and connected on the other side to the input, said second current monitoring module comprising:
    a second current monitoring circuit for monitoring the amplitude of the electrical current passing through it, and
    a second balancing circuit connected on one side to the reference voltage generator to receive the second reference voltage and connected on the other side to the third point of connection to receive a second voltage, the second balancing circuit being arranged to control the second current monitoring circuit so that the voltage at the third point of connection is substantially equal to the second reference voltage.

Advantageously, the protection circuit is such that:
the reference voltage generator generates N reference voltages of decreasing amplitude, N being greater than or equal to 2, and such that
  the protection circuit comprises N current monitoring modules connected in series between the input and the second current monitoring module, each current monitoring module comprising a link input and a link output, the link output of a current monitoring module being connected to a link input of an adjacent current monitoring module, each current monitoring module receiving a reference voltage corresponding to its order of connection, each current monitoring module monitoring the electrical current passing through it so that the voltage on its output is substantially equal to the reference voltage.

The invention relates also an electrical measurement or power supply device comprising terminals for connecting to an electrical energy source and an electrical load to be protected, said load comprising measurement or power supply inputs, said electrical device comprising at least one overvoltage protection circuit as described previously, said at least one protection circuit being connected between a terminal to connect to the electrical energy source and a measurement or power supply input of the electrical load, to protect the measurement or power supply input of the electrical load against the overvoltages transmitted by the electrical energy source.

BRIEF DESCRIPTION OF THE FIGURES

Other advantages and features will emerge more clearly from the following description, of particular embodiments of the invention, given as nonlimiting examples, and represented in the attached drawings in which.

DETAILED DESCRIPTION OF PREFERRED EMBODIMENTS

Figure 1:
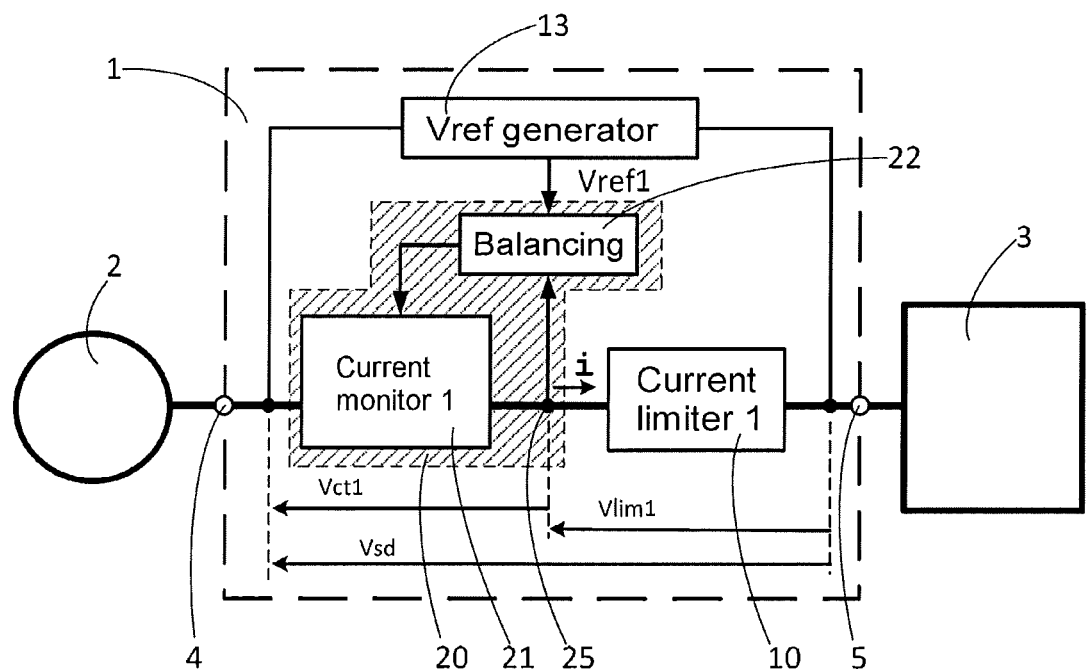
FIG. 1 is a block diagram to illustrate a principle of operation of a protection circuit according to the invention.

FIG. 1 is a block diagram to illustrate a principle of operation of a protection circuit 1 according to the invention. Such a protection circuit 1 comprises an input 4 intended to be connected to an electrical energy source 2. The electrical energy source 2 is also a source of electrical disturbances such as overvoltages and lightning waves. The protection circuit 1 comprises an output 5 intended to be connected to an electrical load 3 to be protected from the electrical disturbances emitted by the energy source 2. A current i circulates between the electrical energy source 2 and the electrical load 3 in order to supply the electrical load with electrical energy. The current i passes through the protection device 1.

The protection circuit 1 comprises a current limiting circuit 10 connected, on one side, to the output 5, and, on the other side, to a first current monitoring circuit 21. The first current monitoring circuit 21 is connected to the input 4. The current limiting circuit 10 and the first current monitoring circuit 21 are connected to one another at a first point of connection 25 and connected in series between the input 4 and the output 5. The current limiting circuit 10 and the first current monitoring circuit 21 are passed through by the current i and arranged to limit or monitor the amplitude of the current i which circulates between the input 4 and the output 5. They behave as dynamically-variable resistors: the current limiting circuit 10 adjusts its internal resistance so that the current i does not exceed a maximum amplitude I_lim1 and the first current monitoring circuit 21 limits the amplitude of the current i as a function of a command generated by a first balancing circuit 22. The first current monitoring circuit 21 and the first balancing circuit 22 form a first current monitoring module 20.

To clarify the description, the output 5 will be considered hereinafter in the document as a potential zero reference point. Obviously, any other reference point can be taken into account. A reference voltage generator 13 is connected between the input 4 and the output 5. This generator is intended to supply a first reference voltage, Vref1, relative to the potential of the output 5. A first balancing circuit 22 is connected on one side to the reference voltage generator 13 to receive the first reference voltage Vref1 and connected on the other side to the first point of connection 25 between the current limiting circuit 10 and the first current monitoring circuit 21 to receive a voltage Vlim1 at the first point of connection 25. The first balancing circuit 22 is also connected to the first current monitoring circuit 21 to control said first current monitoring circuit 21. The first balancing circuit 22 is arranged to compare the first reference voltage Vref1 and the voltage Vlim1 at the first point of connection 25 and to control the first current monitoring circuit 21 so that the voltage Vlim1 at the first point of connection 25, that is to say at the point of connection between the current limiting circuit 10 and the first current monitoring circuit 21, is substantially equal to the first reference voltage Vref1. "Substantially equal" should be understood to mean the fact that the control of the first current monitoring circuit 21 tends to make the voltage Vlim1 at the first point of connection 25 equal to the voltage Vref1 despite the variations of the current i and therefore the variations of the voltage at the first point of connection 25. In effect, the control of the first current monitoring circuit 21 forms part of a regulation loop, the operation of which is detailed hereinbelow: when an overvoltage Vsd generated by the source 2 appears between the input 4 and the output 5, the current i circulates between the input 4 and the output 5 via the current limiting circuit 10 and the first current monitoring circuit 21. The overvoltage Vsd is divided up into the voltage Vlim1 at the terminals of the current limiting circuit 10 and a voltage Vct1 at the terminals of the first current monitoring circuit 21. The function of the first current limiting circuit is to limit the current i to the predefined limit value I_lim1. For that, the current limiting circuit 10 increases its internal resistance when the current i tends to exceed I_lim1 and minimizes its internal resistance when the current i is lower than I_lim1. The first current monitoring circuit 21 limits the current i in a way that is controlled by the first balancing circuit 22: the first balancing circuit 22 controls the first current monitoring circuit 21 so that said circuit adapts its internal resistance in such a way that the voltage Vlim1 is equal to Vref1. The voltage Vct1, at the terminals of the first current monitoring circuit 21, is equal to Vsd−Vlim1. This operation is summarized by the following two relationships:

Vlim1=Vref1

Vct1=Vsd−Vlim1=>Vct1=Vsd−Vref1

By shrewdly choosing Vref1=Vsd/2, the protection circuit 1 permanently ensures the relationship Vlim1=Vct1. Thus, whatever the voltage Vsd appearing between the input 4 and the output 5, the voltage Vsd is equally divided between the current limiting circuit 10 and the first current monitoring circuit 21.

Figure 2:
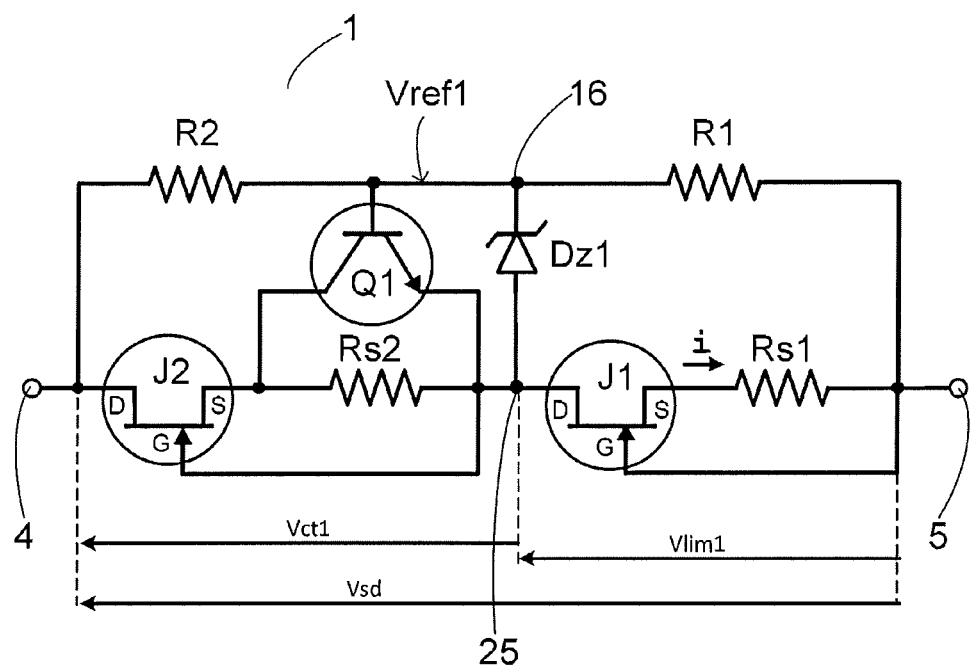
FIG. 2 is a schematic diagram of a protection circuit, according to a preferential embodiment, corresponding to the block diagram of FIG. 1.

FIG. 2 is a schematic diagram of a protection circuit 1, according to a preferential embodiment. The reference voltage generator 13 is produced by means of a first resistor R1 and a second resistor R2 that are connected in series between the input 4 and the output 5, thus forming a voltage divider. The first and the second resistors R1 and R2 have a substantially equal value. A first end of the first resistor R1 is connected to the output 5, a first end of the second resistor R2 is connected to the input 4. The second ends of the first and second resistors R1 and R2 are connected to one another at a second point of connection 16 supplying the first reference voltage Vref1.

The current limiting circuit 10 is produced by means of a first FET transistor J1 whose source is connected to a first end of a first series resistor Rs1. The second end of the first series resistor Rs1 and the gate of the first FET transistor J1 are connected to the output 5 of the protection circuit 1. The first FET transistor J1 is an N-channel field-effect transistor, conducting when the voltage between gate and source is zero.

When a current i circulates in the first series resistor Rs1, in the direction indicated by the arrow in FIG. 2, the gate-source voltage J1 decreases according to Ohm's law. As an example, from a voltage of the order of −7Volt, the drain-source resistance of J1 increases which produces a limiting of the current i. By choosing a first series resistor Rs1 with a value of 20 Ohms, the current i is limited to 350 mA by the current limiting circuit 10.

The first current monitoring circuit 21 is produced on the basis of a scheme equivalent to the limiting circuit 10. The source of a second FET transistor J2 is connected to a first end of a second series resistor Rs2. The second end of the second series resistor Rs2 is connected to the drain of the first FET transistor J1, said connection forming the first point of connection 25. The gate of the second FET transistor J2 is connected to the first point of connection 25. The drain of the second FET transistor J2 is connected to the input 4 of the protection circuit 1.

The first balancing circuit 22 is composed preferentially of a first bipolar transistor Q1 and a first Zener diode Dz1. The first bipolar transistor Q1 is preferentially of NPN bipolar type but can also be of MOSFET type. The collector of the first bipolar transistor Q1 is connected to the first end of the second series resistor Rs2, the emitter of the bipolar transistor Q1 is connected to the second end of the second series resistor Rs2, the base of the transistor Q1 is connected to the second point of connection 16 delivering the first reference voltage Vref1. A first Zener diode Dz1 is connected in parallel to the base-emitter junction of Q1 oriented with the anode of the diode Dz1 connected to the emitter of the transistor Q1 and the cathode of the diode Dz1 connected to the base of the transistor Q1. The first Zener diode Dz1 protects the base-emitter junction of the first bipolar transistor Q1 against a reverse voltage greater than the maximum reverse base-emitter voltage that the transistor Q1 can support. The first Zener diode Dz1, although desired, is optional. When the voltage Vlim1 is lower than Vref1, the voltage between base and emitter of the first bipolar transistor Q1 increases leading to an increase in the current in the collector. A part of the current circulating in the second series resistor Rs2 is diverted into the first bipolar transistor Q1. The voltage at the terminals of the second series resistor Rs2 decreases and consequently the voltage between gate and source of the second FET transistor J2 also decreases. The internal resistance of the first bipolar transistor Q1 decreases, causing an increase in the current i and, consequently, an increase in the voltage Vlim1. Since the reverse effect occurs when the voltage Vlim1 is higher than Vref1, there is thus a regulation effect so that Vlim1 is always substantially equal to Vref1. Given the disparities on the parameters of the first and second transistors J1 and J2 and the fabrication tolerances on the value of the first and second resistors Rs1 and Rs2, a value for Rs2 is preferentially chosen that is greater than two times the value of the first series resistor Rs1, so that the voltage Vct1 is, by default, always higher than Vlim1 and the first bipolar transistor Q1 can effect a balancing between Vref1 and Vlim1 with sufficient latitude.

Preferentially, Rs1=20 Ohms for a limiting of the current i to 400 mA.

Preferably, the first and second FET transistors J1 and J2 are depletion mode JFET or MOSFET field-effect transistors. They are characterized by fabrication in a material with wide energy stop band such as silicon carbide or gallium nitride.

The current limiting circuit 10 represented in FIG. 2 is non-adjustable. It can be made adjustable by using a scheme identical to that of the first current monitoring circuit 21 and by supplying a particular reference voltage. An adjustable current limiting circuit makes it possible to accurately control the limiting value of the current i.

The protection circuit of the invention 1 requires the use of two transistors J1 and J2 connected in series, which offers all of its benefit when the amplitude Vsd of the overvoltage is greater than the maximum voltage withstand strength between source and drain of just one of the first and second transistors J1 and J2. Typically, the maximum voltage withstand strength between source and drain of an FET transistor J1 or J2 is 1200 Volts whereas the expected overvoltages can vary from 2 kV to 8 kV. However it is not sufficient to connect several transistors J1, J2 in series to withstand a high voltage: because of the lack of uniformity of the components, the current limiting circuit 10 or the first current monitoring circuit 21 having the lowest limiting current will have to withstand all the voltage between its terminals. This is why a balanced distribution of the overvoltage over the first and second FET transistors, J1 and J2, by virtue of the balancing circuit 22, allows for a risk-free voltage withstand strength up to the sum of the maximum voltages between source and drain of the transistors J1 and J2, for example 2400 Volts in the present example. This advantage makes it possible to produce a protection circuit comprising as many voltage monitoring circuits as necessary in order to withstand the necessary overvoltage amplitude without risk of destruction of a transistor by avalanche effect.

Figure 3:
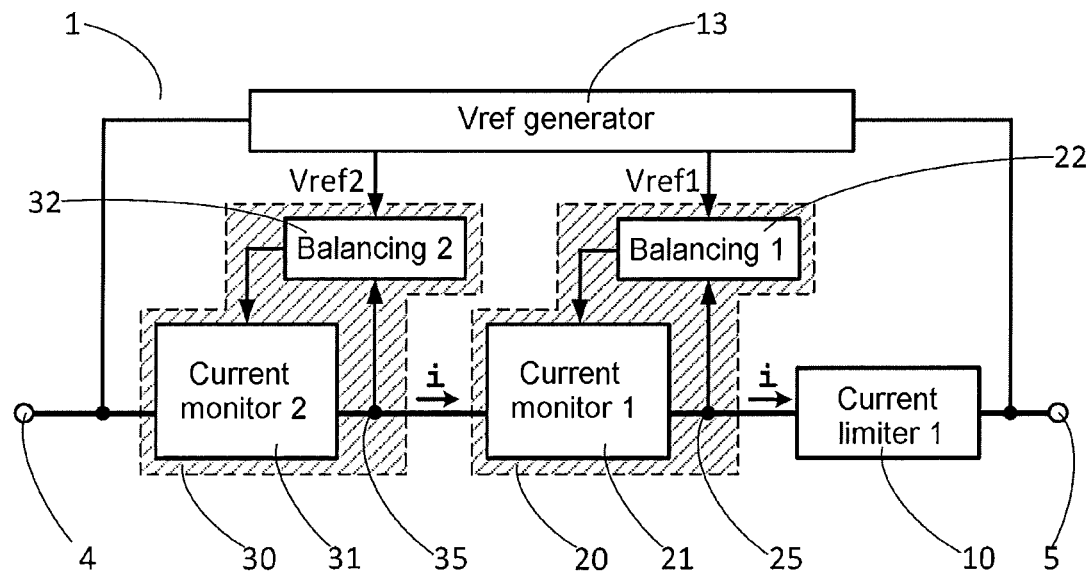
FIG. 3 represents a block diagram of a protection circuit to illustrate an adaptation to a high voltage of an electrical wave of a disturbance.

FIG. 3 represents a block diagram of a protection circuit comprising a current limiting circuit 10 and two current monitoring circuits to illustrate an adaptation to an overvoltage Vsd of amplitude equal to three times the maximum voltage between source and drain of an FET transistor J1 or J2. The reference voltage generator 13 generates a second reference voltage Vref2. Preferentially, the first reference voltage Vref1 will be chosen to be equal to ⅓×Vsd and the second reference voltage Vref2 will be chosen to be equal to ⅔×Vsd.

The protection circuit 1 comprises at least one second current monitoring circuit 31 inserted in series between the input 4 and the first current monitoring circuit 21, as represented in FIG. 3. A second balancing circuit 32 is connected to the reference voltage generator 13 to receive the second reference voltage Vref2. The second balancing circuit 32 is also connected to a third point of connection 35 between the first current monitoring circuit 21 and the second current monitoring circuit 31.

Figure 4:
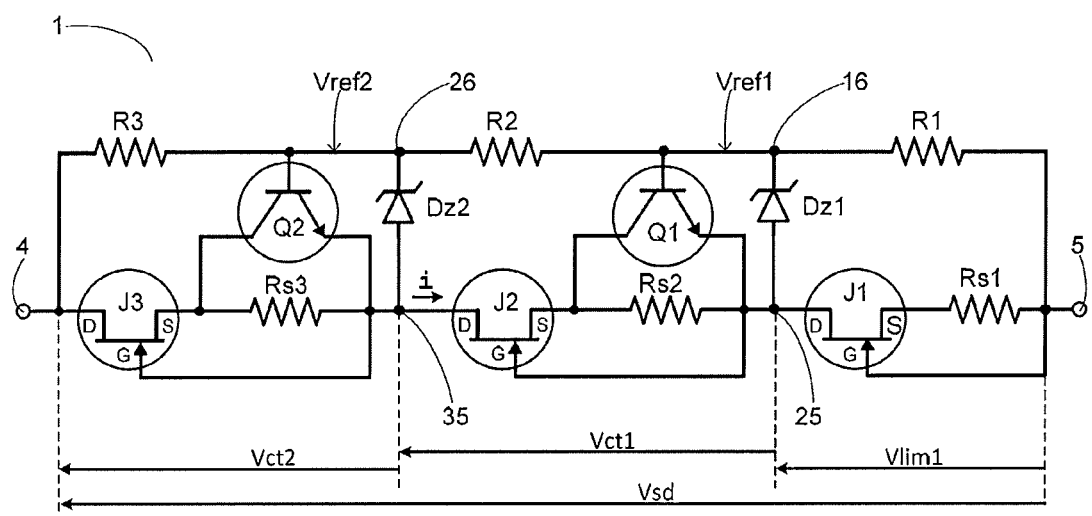
FIG. 4 represents a schematic diagram of a protection circuit corresponding to the block diagram of FIG. 3.

The second balancing circuit 32 is arranged to control the second current monitoring circuit 31 so that the voltage at the third point of connection 35 between the first current monitoring circuit 21 and the second current monitoring circuit 31 is substantially equal to the second reference voltage Vref2. The operation is identical to the operation described previously: the voltage Vsd is divided equally between the current limiting circuit 10, the first current monitoring circuit 21 and the second current monitoring circuit 31. The second current monitoring circuit 31 and the second balancing circuit 32 form a second current monitoring module 30. FIG. 4 represents a schematic diagram of production of a protection circuit 1 corresponding to the block diagram of FIG. 3. The reference voltage generator 13 is produced by means of the first resistor R1, of the second resistor R2 of a third resistor R3, the three resistors being connected in series between the input 4 and the output 5 to form a voltage divider. The first, second and third resistors R1, R2 and R3 preferentially have a substantially equal value. The second current monitoring circuit 31 is composed of a third series resistor Rs3 and a third FET transistor, J3. The second balancing circuit 32 is composed of a second bipolar transistor Q2 and of a second Zener diode Dz2, connected in parallel to the base-emitter junction of Q2. The value of the third series resistor Rs3 is chosen such that Rs3>=2×Rs1 so that the voltage Vct2 at the terminals of the third current limiting circuit 31 is, by default, always higher than Vlim1. A setup, as represented in FIG. 4, is dimensioned to withstand overvoltages of 4 kV amplitude by using FET transistors J1, J2 and J3 supporting a maximum voltage between source and drain of 1500 Volts.

Figure 5:
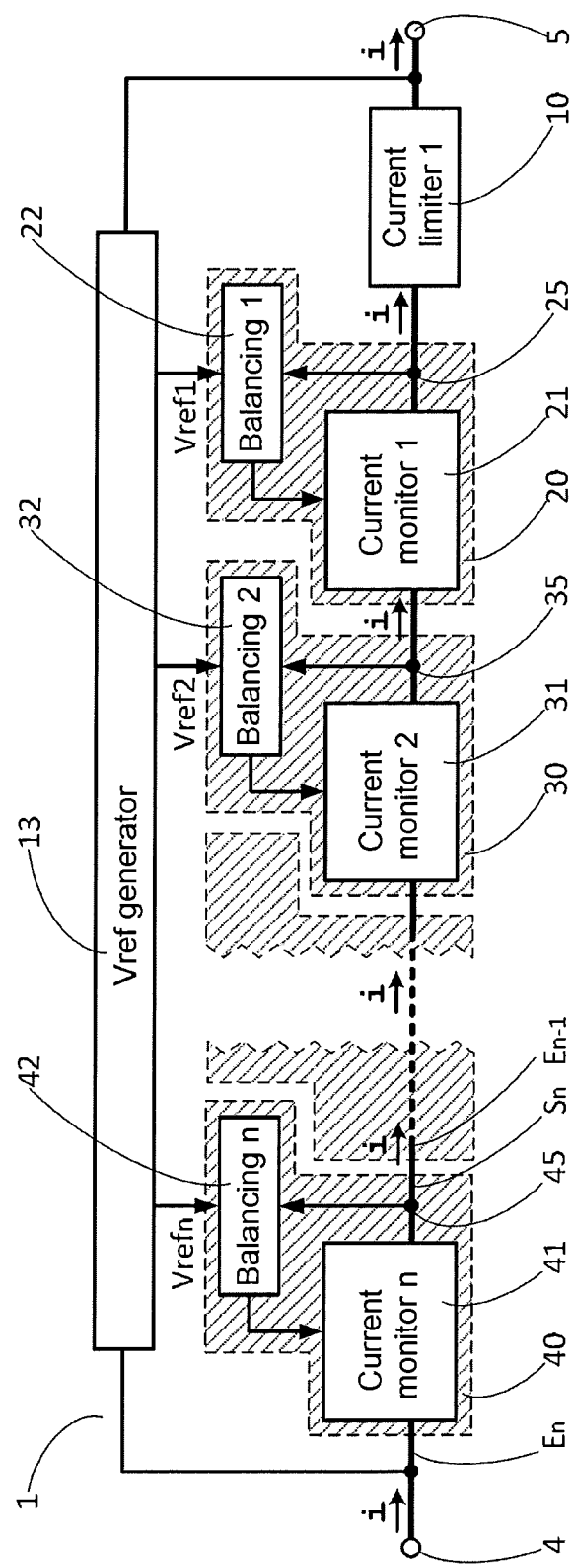
FIG. 5 represents a block diagram of a protection circuit to illustrate a modular adaptation of the protection circuit to a high voltage of a wave of a disturbance.

More generally, it is possible to increase the overvoltage withstand strength of the protection circuit 1 by adding as many current monitoring modules as necessary. Such a protection circuit 1, represented in the form of a block diagram in FIG. 5, is composed of the following elements:
  a current limiting circuit 10 as described previously,
  a reference voltage generator circuit 13 for generating N reference voltages Vref1, . . . , $Vref_n$,
  N current monitoring modules 20, 30, 40, each current monitoring module comprising an input E1, E2, En, and an output S1, S2, Sn, and comprising:
    a current monitoring circuit 21, 31, 41, and
    a balancing circuit 22, 32, 42 connected on one side to the reference voltage generator 13 to receive a reference voltage Vref1, Vref2, $Vref_n$ and connected on the other side to the output S1, S2, Sn of the current monitoring module 20, 30, 40, said balancing circuit 22, 32, 42 being arranged to control the current monitoring circuit 21, 31, 41 so that the voltage at the output of the monitoring module S1, S2, Sn is substantially equal to the reference voltage Vref1, Vref2, $Vref_n$, The N reference voltages Vref1, Vref2, . . . , $Vref_n$, are preferentially generated by dividing the voltage between the input 4 and the output 5 by N+1: for that, a divider bridge is preferentially used, consisting of N+1 resistors of substantially identical value R1, R2, R3, . . . , $R_{N+1}$, connected in series between the input 4 and the output 5. Each of the N reference voltages $Vref_n$ is tapped at the point of connection between the $N^{th}$ resistor and the $N+1^{th}$ resistor. Thus
  $Vref1 < Vref2 < \ldots < Vref_{n-1} < Vref_n$.

The current limiting circuit 10 and the N current monitoring modules are connected in series between the input 4 and the output 5 of the protection circuit 1 in an order corresponding to the amplitude of the reference voltages Vref1, . . . , $Vref_n$: the current monitoring module 41 whose input En is connected to the input 4 of the protection circuit, receives the reference voltage of the highest amplitude, $Vref_n$, a current monitoring module of rank N−1 receives the reference voltage of immediately lower amplitude, $Vref_{n-1}$ and so on to the current monitoring module 20 of rank 1 which receives the reference voltage Vref1.

To withstand an overvoltage of 8 kV amplitude by associating current monitoring modules 41 whose unitary withstand strength is 1500 V, it is necessary to use 8000/1500=5.3 modules. In practice, a protection circuit 1 addressing such a specification will comprise a current limiting circuit 10 connected in series with five current monitoring modules 20, 30, 40.

Figure 6:
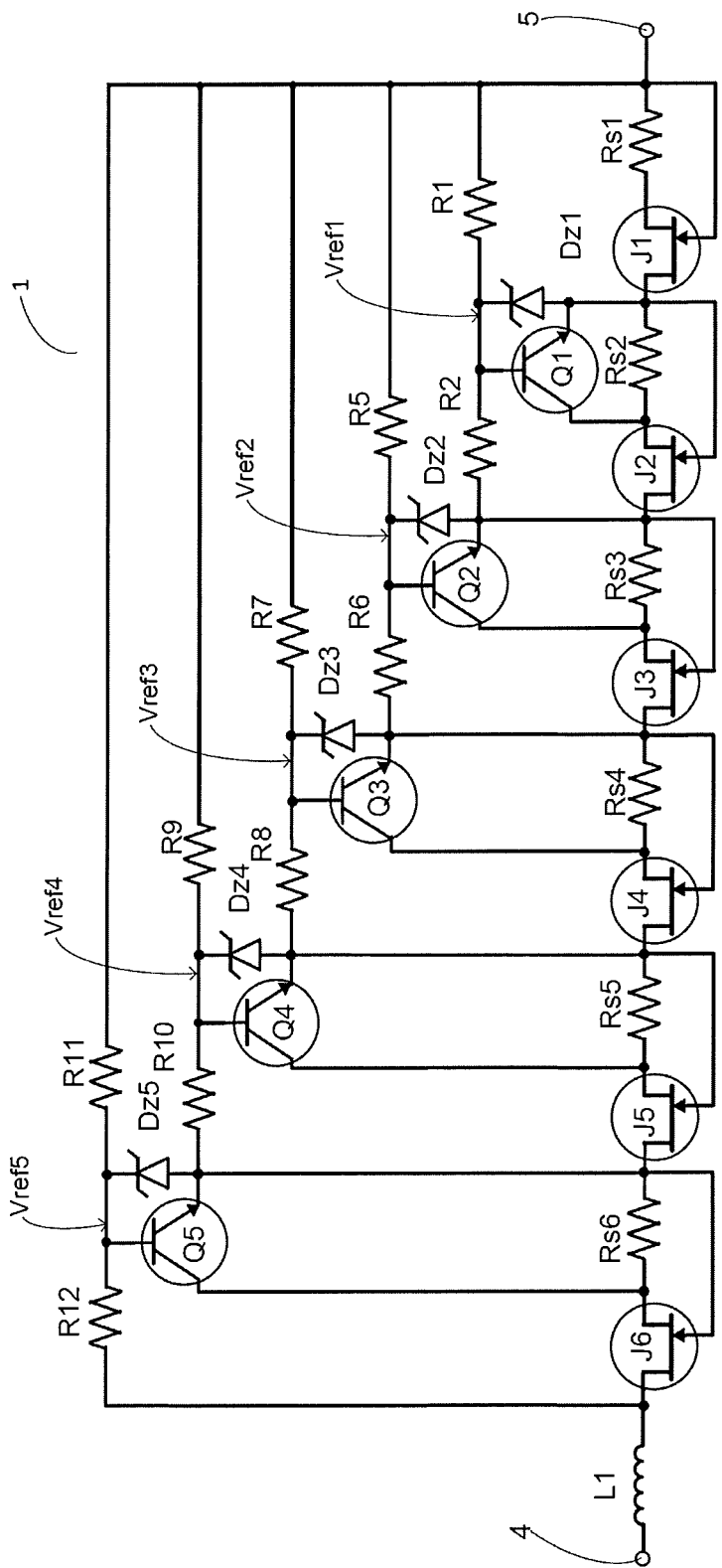
FIG. 6 is a schematic diagram of an embodiment of a protection circuit comprising several modules for adaptation to a high voltage of a wave of a disturbance.

FIG. 6 is a schematic diagram of an embodiment of a protection circuit 1, comprising a current limiting circuit 10 and five current monitoring modules 20, 30, 40. The reference voltage generator circuit 13 is represented in the form of a variant embodiment: it is composed of the resistors R1, R2, R5, R6, R7, R8, R9, R10, R11 and R12. The first reference voltage, Vref1, is delivered at the point of connection between the resistors R1 and R2. The second reference voltage, Vref2, is delivered at the point of connection between the resistors R5 and R6, and so on. In order for the values of the reference voltages Vref1, Vref2, Vref3, Vref4 and Vref5 to be corrected and uniformly divided up, the value of the resistors of the reference voltage generator 13 is chosen as follows:

R1=R2=R6=R8=R10=R12,
R5=2×R1,
R7=3×R1,
R9=4×R1, and
R11=5×R1.

There are the first current limiting circuit 10, the first and second current monitoring circuits 21, 31 and the first and second balancing circuits 22, 32 described previously. A third current monitoring module is composed of a fourth JFET transistor J4, of a fourth series resistor Rs4, of a third bipolar transistor Q3 and of a third Zener diode Dz3. A fourth current monitoring module is composed of a fifth JFET transistor J5, of a fifth series resistor Rs5, of a fourth bipolar transistor Q4 and of a fourth Zener diode Dz4. Finally, a fifth current monitoring circuit is composed of a sixth JFET transistor J6, of a sixth series resistor Rs6, of a fifth bipolar transistor Q5 and of a fifth Zener diode Dz5. An inductor L1 is connected in series between the input 4 and the drain of the JFET transistor J6 to attenuate the steepness of the rising edge of the current i induced by a sudden appearance of overvoltage. This variant offers a very good response to sudden edges of the overvoltage wave appearing between the input 4 and the output 5 and a very good high voltage withstand strength.

Figure 7:
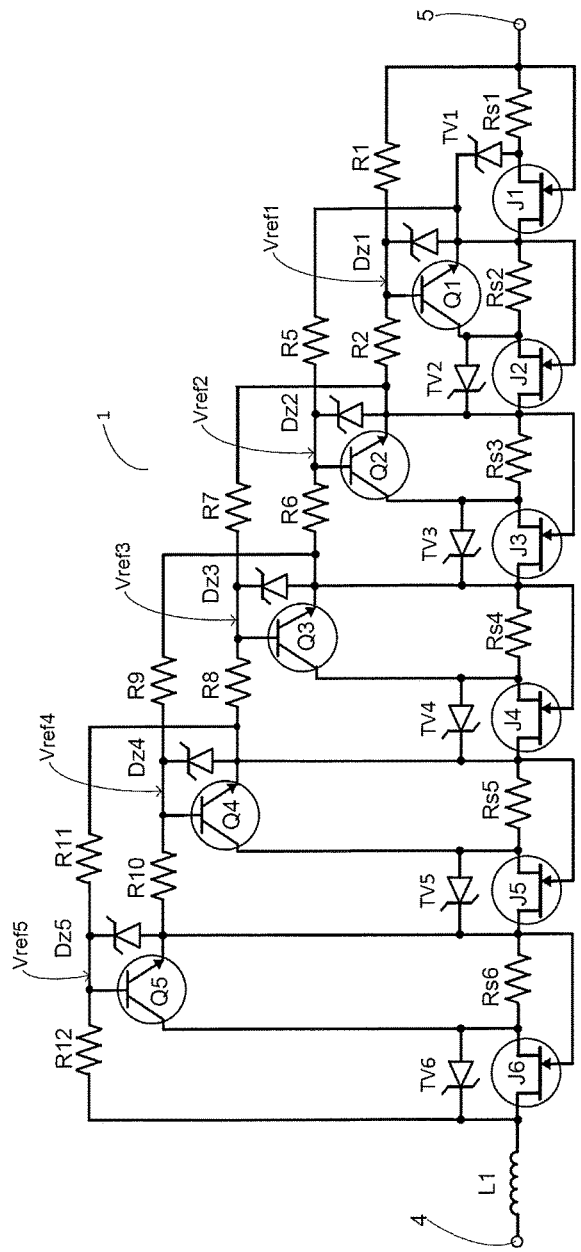
FIG. 7 is a schematic diagram of a variant embodiment of a protection circuit comprising several adaptation modules.

Other variants can be used as represented in FIG. 7: in this embodiment, the resistors forming the reference voltage generator have the same value:

R1=R2=R5=R6=R7=R8=R9=R10=R11=R12.

Optionally, varistors TV1, TV2, TV3, TV4, TV5 and TV6 are connected respectively in parallel to each of the FET transistors J1, J2, J3, J4, J5 and J6 in order to protect these FET transistors against overvoltages exceeding the voltage withstand strength of the protection circuit 1.

The invention relates also to an electrical measurement or power supply device 8 comprising at least one such overvoltage electrical protection circuit 1. The electrical device 8 can be installed in a circuit breaker, for example as all or part of a trip intended to control the opening of the circuit breaker in the event of an electrical fault. The electrical device 8 can also be a device for measuring electrical parameters such as voltage, frequency, current, power or even energy in an electrical network. Such a device 8 comprises at least two terminals AC1, AC2 for connecting to an electrical energy source 2 and an electrical load 3 to be protected, said load comprising measurement or power supply inputs 37, 38. The device 8 comprises at least one protection circuit 1, the input 4 of which is connected to the connection terminal AC1, and the output 5 of which is connected to a measurement or power supply input 37 of the electrical load 3, to protect the electrical load 3 against the overvoltages transmitted by the electrical network. A second protection circuit 1b can be used, an input 6 being connected to the connection terminal AC2 and an output 7 being connected to an input 38 of the electrical load 3. Such a setup offers the advantage of protecting the electrical load 3 against the overvoltages of positive or negative polarity between the terminals AC1 and AC2: the protection circuit 1 ensures overvoltage protection and a limiting of the current following an overvoltage when the voltage on the terminal AC1 is higher than the voltage on the terminal AC2, and the protection circuit 1b ensures a protection when the voltage on the terminal AC2 is higher than the voltage on the terminal AC1. Such a setup also avoids a wiring of two protection circuits 1 mounted head-to-tail on each input 4, 6 to protect the electrical load from overvoltages of positive or negative polarity.

The use of at least protection circuit 1 according to the invention is particularly advantageous for protecting an electrical load 3 comprising a capacitor C connected between the measurement or power supply inputs 37, 38. In effect, the protection circuit 1 will protect the electrical load 3 against the overvoltages appearing between the terminals AC1 and AC2 but also limit to a predefined and controlled value, the current induced by an overvoltage, or the inrush current circulating in the capacitor C when the electrical load 3 is powered up. Consequently, the heating of the components subjected to the current i or to the voltage Vsd will be limited.

Figure 8:
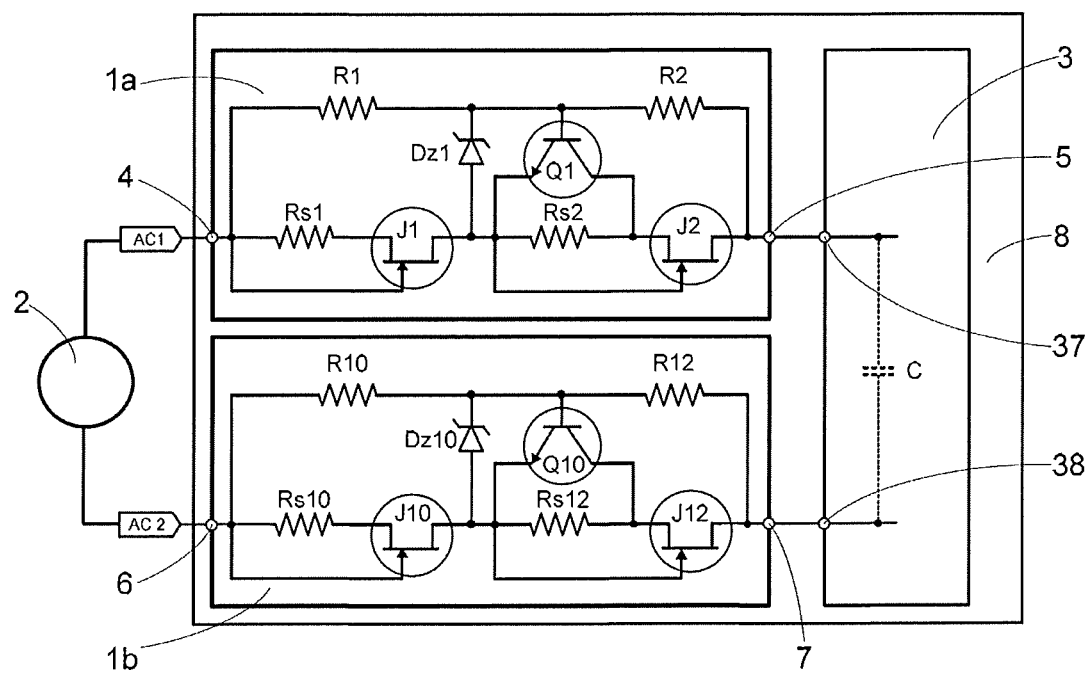
FIG. 8 represents a diagram of layout of two protection circuits in an electrical device comprising a device to be protected against overvoltages.

The diagram of connection of the components of the protection circuit 1 represented in FIG. 8 is a "dual" diagram of the diagram represented in FIG. 1: the current limiting circuit 10 is connected to the input 4 of the protection circuit whereas the first current monitoring circuit 21 is connected to the output 5. This arrangement does not affect the operation of the protection circuit 1 and can be considered as a variant embodiment.

Figure 9:
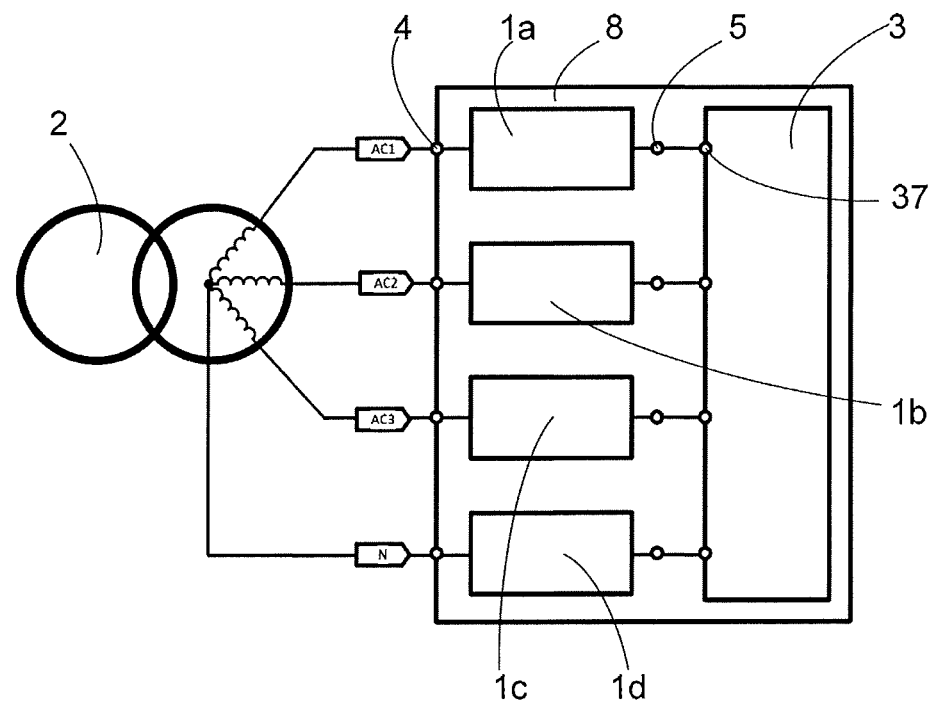
FIG. 9 represents a diagram of layout of four protection circuits in an electrical device comprising a device to be protected against overvoltages, powered by a three-phase energy source.

Quite clearly, in a three-phase installation, a third protection circuit 1c will be able to be used to protect a third connection to a terminal AC3, a fourth protection circuit 1d will be able to be used to protect a fourth connection to a terminal ACN corresponding to a connection to a Neutral line, and several current monitoring modules 20, 30, 40 can be used in each of the protection circuits 1a, 1b, 1c and 1d to increase the voltage withstand strength. As a nonlimiting example, FIG. 9 represents a diagram of layout of four protection circuits 1a, 1b, 1c and 1d in a measurement or power supply device 8 powered by a three-phase energy source.

In normal operation, that is to say without disturbance, the low resistance of the FET transistors J1, J2 and of the series resistors Rs1, Rs2, generates a low voltage drop and an insignificant heating. The response time of the protection circuit, associated with the low stray capacitances of the components, is also noteworthy. Furthermore, the protection circuit 1 has a withstand strength capacity that is unlimited in terms of number of overvoltages and therefore a great lifespan since the amplitude of the current i is controlled and the disturbing voltage is distributed evenly, and at any instant, over the limiting circuit and over each current monitoring circuit. Finally, the ease of production and of adaptation to high overvoltage levels make the protection circuit 1 particularly cost-effective and attractive in the context of industrial operation.

The invention claimed is:

1. A protection circuit for an electrical load intended to be connected in series between an electrical energy source and the electrical load to be protected, the electrical energy source supplying an electrical current to the electrical load, said protection circuit comprising:
    a protection circuit input for connecting the protection circuit to the electrical energy source;
    a protection circuit output for connecting to the electrical load;
    a reference voltage generator circuit arranged to supply at least a first reference voltage;
    a current limiting circuit, connected to the protection circuit output, said limiting circuit being arranged to limit the electrical current passing through the protection circuit output, wherein the current limiting circuit comprises a first normally closed type field-effect transistor and a first series resistor connected between a gate and a source of the first field-effect transistor, a drain of the first field-effect transistor being connected to a first point of connection, and the gate of the first field-effect transistor being connected to the protection circuit output; and
    a first current monitoring module, connected in series on a first side with the limiting circuit at the first point of connection and on a second side connected to the protection circuit input, said first current monitoring module comprising:
        a first current monitoring circuit for monitoring an amplitude of the electrical current passing through the first current monitoring circuit, and
        a first balancing circuit connected to the reference voltage generator circuit to receive the first reference voltage and connected to the first point of connection to receive a first voltage, the first balancing circuit being arranged to control the first current monitoring circuit so that the first voltage is substantially equal to the first reference voltage.

2. The protection circuit according to claim 1, wherein the first current monitoring module further comprises:
    a second normally closed field-effect transistor and a second series resistor connected between a gate and a source of the second field-effect transistor, a drain of the second field-effect transistor being connected to the protection circuit input, and
    a first NPN type bipolar transistor connected such that:
        a collector of the first bipolar transistor is connected to the source of the second field-effect transistor,
        an emitter of the first bipolar transistor is connected to the gate of the second field-effect transistor and to the first point of connection, and
        a base of the first bipolar transistor is connected to the reference voltage generator to receive the first reference voltage.

3. The protection circuit according to claim 2, wherein the first and second field-effect transistors are fabricated in silicon carbide or gallium nitride.

4. The protection circuit according to claim 1, wherein the reference voltage generator circuit is linked on a first side to the protection circuit input and on a second side to the protection circuit output.

5. The protection circuit according to claim 4, wherein the reference voltage generator circuit comprises a first resistor and a second resistor, of substantially equal value connected in series, and
    wherein the first reference voltage is supplied at a second point of connection between the first and the second resistors.

6. The protection circuit according to claim 1, wherein the current limiting circuit limits the current to an amplitude lying between 50 and 500 mA.

7. An overvoltage protection circuit according to claim 1, wherein the reference voltage generator circuit generates a second reference voltage, of amplitude greater than the first reference voltage, and
    wherein
    a second current monitoring module is connected in series on a first side with the first current monitoring module at a third point of connection, and connected on a second side to the protection circuit input, said second current monitoring module comprising:
        a second current monitoring circuit for monitoring the amplitude of the electrical current passing through the second current monitoring circuit, and
        a second balancing circuit connected on a first side to the reference voltage generator circuit to receive the second reference voltage and connected on a second side to the third point of connection to receive a second voltage, the second balancing circuit being arranged to control the second current monitoring circuit so that a voltage at the third point of connection is substantially equal to the second reference voltage.

8. The protection circuit according to claim 7, wherein:
    the reference voltage generator circuit generates N reference voltages of decreasing amplitude, N being greater than or equal to 2, and
    wherein the protection circuit comprises N current monitoring modules connected in series between the protection circuit input and the second current monitoring module, each current monitoring module comprising a link input and a link output, the link output of a current monitoring module being connected to a link input of an adjacent current monitoring module, each current monitoring module receiving a reference voltage corresponding to its order of connection, each current monitoring module monitoring the electrical current passing through said each current monitoring module so that the voltage on its output is substantially equal to the reference voltage.

9. An electrical measurement or power supply device comprising terminals for connecting to an electrical energy source and an electrical load to be protected, said load comprising measurement or power supply inputs, wherein the electrical device comprises at least one overvoltage protection circuit according claim 1, said at least one protection circuit being connected between a terminal for connecting to the electrical energy source and a measurement or power supply input of the electrical load, to protect the measurement or power supply input of the electrical load against overvoltages transmitted by the electrical energy source.

10. The protection circuit according to claim 1, wherein the first field-effect transistor is fabricated in silicon carbide or gallium nitride.

11. A protection circuit for an electrical load intended to be connected in series between an electrical energy source and the electrical load to be protected, the electrical energy source supplying an electrical current to the electrical load, said protection circuit comprising:
a protection circuit input for connecting the protection circuit to the electrical energy source;
a protection circuit output for connecting to the electrical load;
a reference voltage generator circuit arranged to supply at least a first reference voltage;
a current limiting circuit, connected to the protection circuit output, said limiting circuit being arranged to limit the electrical current passing through the protection circuit output, wherein the current limiting circuit comprises:
a first normally closed field-effect transistor and a resistor connected between a gate and a source of the first field-effect transistor, a drain of the first field-effect transistor being connected to the protection circuit input, and
a first NPN type bipolar transistor connected such that:
a collector of the first bipolar transistor is connected to the source of the first field-effect transistor,
a emitter of the first bipolar transistor is connected to the gate of the first field-effect transistor and to the first point of connection, and
a base of the first bipolar transistor is connected to the reference voltage generator to receive the first reference voltage; and
a first current monitoring module, connected in series on a first side with the limiting circuit at a first point of connection and on a second side connected to the protection circuit input, said first current monitoring module comprising:
a first current monitoring circuit for monitoring an amplitude of the electrical current passing through the first current monitoring circuit, and
a first balancing circuit connected to the reference voltage generator circuit to receive the first reference voltage and connected to the first point of connection to receive a first voltage, the first balancing circuit being arranged to control the first current monitoring circuit so that the first voltage is substantially equal to the first reference voltage.

12. The protection circuit according to claim 11, wherein the first field-effect transistor is fabricated in silicon carbide or gallium nitride.

13. The protection circuit according to claim 11, wherein the reference voltage generator circuit is linked on a first side to the protection circuit input and on a second side to the protection circuit output.

14. The protection circuit according to claim 13, wherein the reference voltage generator circuit comprises a first resistor and a second resistor of substantially equal value connected in series, and
wherein the first reference voltage is supplied at a second point of connection between the first and the second resistors.

15. The protection circuit according to claim 11, wherein the current limiting circuit limits the current to an amplitude lying between 50 and 500 mA.

16. A protection circuit for an electrical load intended to be connected in series between an electrical energy source and the electrical load to be protected, the electrical energy source supplying an electrical current to the electrical load, said protection circuit comprising:
a protection circuit input for connecting the protection circuit to the electrical energy source;
a protection circuit output for connecting to the electrical load;
a reference voltage generator circuit arranged to supply at least a first reference voltage;
a current limiting circuit, connected to the protection circuit output, said limiting circuit being arranged to limit the electrical current passing through the protection circuit output; and
a first current monitoring module, connected in series on a first side with the limiting circuit at a first point of connection and on a second side connected to the protection circuit input, said first current monitoring module comprising:
a first current monitoring circuit for monitoring an amplitude of the electrical current passing through the first current monitoring circuit, and
a first balancing circuit connected to the reference voltage generator to receive the first reference voltage and connected to the first point of connection to receive a first voltage, the first balancing circuit being arranged
to control the first current monitoring circuit so that the first voltage is
substantially equal to the first reference voltage,
wherein the reference voltage generator circuit is linked on a first side to the protection circuit input and on a second side to the protection circuit output,
wherein the reference voltage generator circuit comprises a first resistor and a second resistor of substantially equal value connected in series, and
wherein the first reference voltage is supplied at a second point of connection between the first and the second resistors.

17. The protection circuit according to claim 16, wherein the first field-effect transistor is fabricated in silicon carbide or gallium nitride.

18. The protection circuit according to claim 16, wherein the reference voltage generator circuit is linked on a first side to the protection circuit input and on a second side to the protection circuit output.

19. The protection circuit according to claim 18, wherein the reference voltage generator circuit comprises a first resistor and a second resistor of substantially equal value connected in series, and
wherein the first reference voltage is supplied at a second point of connection between the first and the second resistors.

20. The protection circuit according to claim 16, wherein the current limiting circuit limits the current to an amplitude lying between 50 and 500 mA.

* * * * *